(12) United States Patent
Burton et al.

(10) Patent No.: US 10,843,156 B2
(45) Date of Patent: *Nov. 24, 2020

(54) REACTOR SYSTEM (71) Applicant: Rachel Burton, Moncure, NC (US)

(72) Inventors: Rachel Burton, Moncure, NC (US);
Gregory B Austic, Ann Arbor, MI
(US); Xiaohu Fan, Clemson, SC (US)

(73) Assignee: Rachel Burton, Moncure, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,761

(22) Filed: Mar. 8, 2019

(65) Prior Publication Data
US 2019/0247815 A1 Aug. 15, 2019

Related U.S. Application Data (63) Continuation of application No. 14/129,694, filed as application No. PCT/US2012/044440 on Jun. 27, 2012, now Pat. No. 10,226,748.
(Continued)

(51) Int. Cl.
*B01J 8/00* (2006.01)
*B01J 10/00* (2006.01)
(Continued)

(52) U.S. Cl.
CPC .............. *B01J 8/008* (2013.01); *B01J 4/004* (2013.01); *B01J 10/00* (2013.01); *B01J 19/006* (2013.01);
(Continued)

(58) Field of Classification Search
CPC . B01J 8/008; B01J 19/006; B01J 10/00; B01J 19/1881; B01J 4/004;
(Continued)

(56) References Cited

U.S. PATENT DOCUMENTS

2,621,207 A * 12/1952 Fusco ................... C07C 69/712
560/62
3,911,064 A * 10/1975 McWhirter ......... B01F 3/04539
261/87
(Continued)

*Primary Examiner* — Huy Tram Nguyen
(74) *Attorney, Agent, or Firm* — Avyno Law P.C.

(57) ABSTRACT

A reactor tank is provided having an enzyme inlet, a heating jacket positioned around the exterior center of the tank, a gas outlet for communicating with a vacuum apparatus to create a vacuum within the reactor tank and for communicating with a condensing unit, a first gas inlet for receiving gas from a feed tank and a first liquid outlet for recirculating the liquid from the first liquid outlet back to the feed tank. The reactor tank further includes a sparged unit and a screen positioned within the tank between the sparged unit and the first liquid outlet, where the sparged unit is connected to the first gas inlet for receiving gas from the feed tank. The reactor tank is utilized in a reactor system further including a condensing unit, vacuum pump or venturi valve, a first feed tank connected to the first gas inlet, a coalescer having at least one circulation pipe and a first circulation pump connected to the first liquid outlet for circulating a portion of the liquid dispelled from the liquid outlet to the coalescer, which after being filtered through coalescer is recirculated through circulation pipe back to the first feed tank.

16 Claims, 8 Drawing Sheets

Related U.S. Application Data

(60) Provisional application No. 61/501,352, filed on Jun. 27, 2011.

(51) Int. Cl.
  *B01J 19/00* (2006.01)
  *B01J 19/18* (2006.01)
  *B01J 4/00* (2006.01)

(52) U.S. Cl.
  CPC .. *B01J 19/1881* (2013.01); *B01J 2208/00796* (2013.01); *B01J 2219/00006* (2013.01); *B01J 2219/00094* (2013.01)

(58) Field of Classification Search
  CPC .... B01J 2219/00006; B01J 2208/00796; B01J 2219/00094
  USPC .................................................. 422/603, 187
  See application file for complete search history.

(56) References Cited

U.S. PATENT DOCUMENTS

| | | | | |
|---|---|---|---|---|
| 6,362,364 | B1 * | 3/2002 | Hirata | C04B 24/2641 |
| | | | | 524/5 |
| 2009/0076985 | A1 * | 3/2009 | Morgan | C11C 3/003 |
| | | | | 705/500 |

* cited by examiner

REACTOR SYSTEM

CROSS-REFERENCE TO RELATED APPLICATIONS

This invention claims priority to U.S. Provisional Patent Application Ser. No. 61/501,352, titled Apparatus and Method for Esterification, filed the Jun. 27, 2011, the contents of which are incorporated by reference into this application in its entirety.

FIELD OF INVENTION

This invention relates to a reactor system, and in particular to a reactor system that performs esterification and moisture removal.

BACKGROUND

In an esterification process, to esterify a fatty acid, for example, the fatty acid is placed in a vessel and heated and stirred. A catalyst is added and esterification is then carried out by keeping the temperature constant and by adding alcohol. A vapor is created by the process, whereby the water is then stripped from the vapor. Esterification is quite slow and side-products are often formed when catalysts are maintained at high temperatures for such long periods of time.

A system is needed that can operate effectively at lower temperatures, thereby minimizing production of side-products and the reversal of the esterification. A system is further needed that permits for moisture removal while allowing for the reuse of alcohols and avoiding excess build-up of alcohol in the reaction mixture.

SUMMARY OF THE INVENTION

A reactor and reactor system is provided that includes a reactor comprised of a tank having a catalyst inlet, a heating jacket positioned around the exterior center of the tank, a gas outlet for communicating with a vacuum apparatus to create a vacuum within the reactor tank and for communicating with a condensing unit, a first gas inlet for receiving gas from a feed tank and a first liquid outlet for recirculating the liquid from the first reactor back to the feed tank. The reactor tank further includes a sparged unit positioned within the tank and a screen positioned within the tank between the sparged unit and the first liquid outlet where the sparged unit is connected to the first gas inlet for receiving gas from the feed tank.

The reactor tank is further utilized in a reactor system that includes a vacuum apparatus (e.g., vacuum pump or venturi valve) connected to the first gas outlet for creating the vacuum within the tank, a first feed tank connected to the reactor for feeding the fluid to the first reactor, a coalescer, a first circulation pump connected to the first liquid outlet for circulating liquid from the liquid outlet to the coalescer, at least one circulation pipe between the coalescer and the first feed tank for recirculating liquid from the liquid outlet to the first feed tank after the liquid passes through the coalescer.

The reactor system of the present invention can be designed to operate as a multi-stage, automated, continuous stirred tank reactor or as a batch manual continuous stirred tank reactor. When operating as a continuous stirred tank reactor, the reactor system includes, at a minimum, a reactor tank, an alcohol tank having a dosing pump for pumping alcohol into the reactor tank and a liquid separating unit in communication with the tank to draw liquid from the tank and filter the liquid for recirculation of the filtered liquid back into the alcohol tank.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DESCRIPTION OF FIGURES

The components in the figures are not necessarily to scale, emphasis instead being placed upon illustrating the principles of the invention. In the figures, like reference numerals designate corresponding parts throughout the different views.

DETAILED DESCRIPTION

For purposes of this application, it will be understood that terms such as "communicate" and "in . . . communication with" (for example, a first component "communicates with" or "is in communication with" a second component) are used to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

Figure 1:
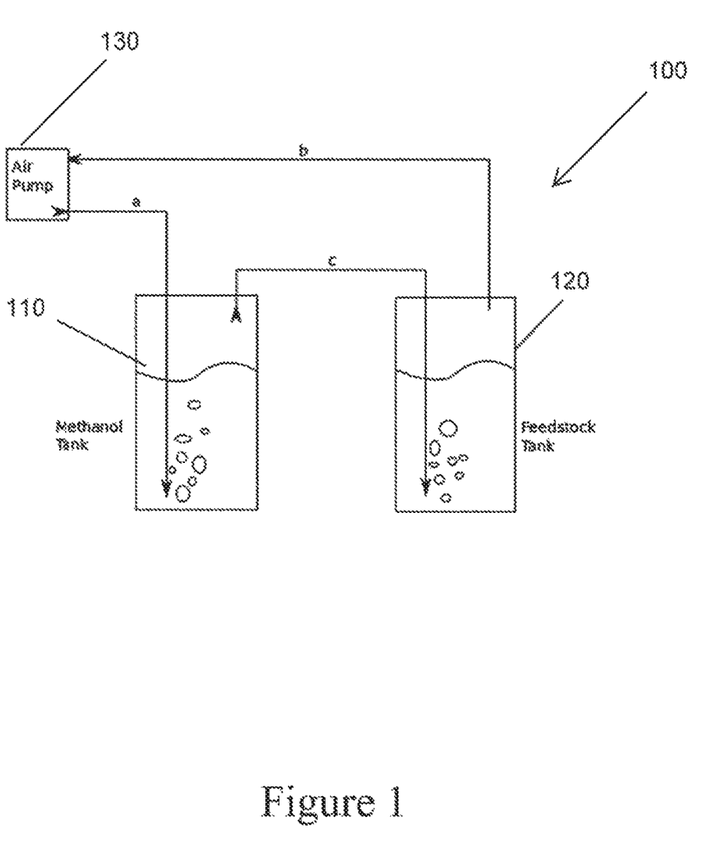
FIG. 1 illustrates a diagram of one example of a basic moisture removal reactor system.

FIG. 1 illustrates a basic reactor system 100 that is designed for the purposes of using a gas phase to transfer fluids between two tanks 110, 120 for purposes of concentrating one component in one tank 110, while regulating the other component quantity in the other tank 120. For purposes of illustration, FIG. 1 illustrates a reactor system 100 that, for purposes of this application, will be referred to as the alcohol bubble reactor method (the "AB method"). Tank 110 is an alcohol tank and tank 120 is a feedstock tank or reactor where air is bubbled through the alcohol tank 110 by air pump 130.

In one example of an implementation, the AB method may be utilized, for example, for the esterification of fatty acids using immobilized enzymes (e.g., Novozym 435). The AB method operates, in its most simplistic form as illustrated in FIG. 1. Tank 110 contains 100% methanol. The air pump 130 bubbles gas into the methanol tank 110. The methanol tank 110 then becomes saturated with methanol based on the vapor pressure, temperature and pressure of the tank 110. Gas then passes from the head space of the methanol tank 110 into the feedstock tank 120, which may also be referred to as the reactor or the reactor tank. The reactor tank 120 contains raw material, such as feedstock, which may include fats, oils or any combination fats and oils. Here, some of the methanol vapors exchange into the feedstock (which is soluble if the feedstock is biodiesel of FFA, and partially soluble if the feedstock is mono-, di-, tri-acyl glycerides, for example). Water in the feedstock tank 120 exchanges into the gas phase and, along with some methanol, transfers back into the methanol tank 110 via the air pump 130. There, the water from the gas phase dissolves into the methanol in the methanol tank 110.

After enough gas flow in the closed system 100, the liquids come to equilibrium in the system 100 based on the physical properties of the three (3) components of the system (i.e., feedstock, alcohol, water) based on their vapor-liquid equilibrium ("VLE") in each part of the system 100. In operation, the feedstock tank 120 is maintained hotter (35-70 C) than the methanol tank 110 (0-35 C). As such, the water tends to end up in the methanol tank 110 after being removed from the feedstock tank 120 as a gas vapor. The methanol tends to be split between the two tanks 110, 120 with the majority ending up in the methanol tank 110. Removing the water from the feedstock tank 120 is particularly useful for the esterification reaction because it removes a product (e.g. water, in the illustrated example) that inhibits the formation of esters, while maintaining a constant but low quantity of an input (e.g. methanol (illustrated)) in the reaction solution (e.g., feedstock (illustrated)). When using enzymes, which are deactivated by large amounts of methanol, keeping a constant but very low quantity of methanol in the reactor 120 is useful both in replenishing methanol consumed in the reaction and in reducing enzyme deactivation.

Another way to understand the system is that methanol is a "carrier gas" that tends to draw moisture out of the feedstock and deposits this moisture as a liquid phase in the methanol based on VLE of the components.

In general, the system may operate using four components: (i) oil or raw material/feedstock (component 1); (ii) alcohol (e.g., methanol) (component 2); (iii) water (component 3); and (iv) gas (i.e., air, nitrogen, CO2, etc.)(component 4). Good component combinations include any fats and oils, alcohols, water or other polar liquids with vapor pressures higher than the fat/oil. The following alcohols, among others, may be utilized as part of the system: (i) methanol, water (no azeotrope, good other conditions); (ii) acetic acid, water (no azeotrope, boiling point=118 C); (iii) formic acid, water (azeotrope at 77.5, bp fa in water 100.8 C); (iv) ethylene chloride (83 BP ec in water); (v) propylene chloride (96.8 BP pc in water); and (vi) chloroform (61.2 BP chloroform in water). The system may further utilize a biological catalyst like an enzyme or other solid or liquid chemical catalysts like sulfuric acid: (i) gas phase—lamare and legoy, 1993; (ii) solvents for lipases—Reetz (2002a); (iii) carbohydrates; (iv) dehydrogenase; (v) alcoholysis; (vi) monoglyceride production; (vii) cofactor recycling with oxidoreductases; (viii) lyase and isomerase; and (ix) nitriles. It should be noted that while the reaction described in the application is described in connection with the use of a biological catalyst like an enzyme, any solid or liquid catalyst could be utilized without departing from the scope of the invention.

For effective operation, the system 100 requires that water favors the gas phase over the liquid phase; Component 2 must have limited solubility component 1; component 1 must have a high boiling point (i.e., low vapor pressure) relative to components 2 and 3; and component 3 must be fully soluble in component 2 and only partially soluble in component 1. In this specific example, water favors the gas phase over the liquid phase, the methanol has limited solubility in the oil, the oil has a high boiling point relative to the methanol and water and the water is fully soluble in the methanol and partially soluble in the gas.

The effectiveness of the system 100 is further enhanced if (i) when combined in the absence of component 2, component 3 and component 1 have very low or no solubility; (ii) component 2 and component 3 should not form an azeotrope, or if they do the azeotrope should be very high (for example, ethanol can be used with a water/ethanol azeotrope at 95 wt %); (iii) component 2 and 3 are on opposite sides of the reaction, such that adding component 2 and removing component 3 pushes the reaction forward; (iv) use of excess amounts of component 2 or 3 are avoided as excess amounts negatively impact some part of the system (for example, deactivation of enzymatic catalysts); and (v) there is a low maximum temperature for the reaction so that heat and vacuum for component 3 removal are more costly or impractical options.

Figure 2A:
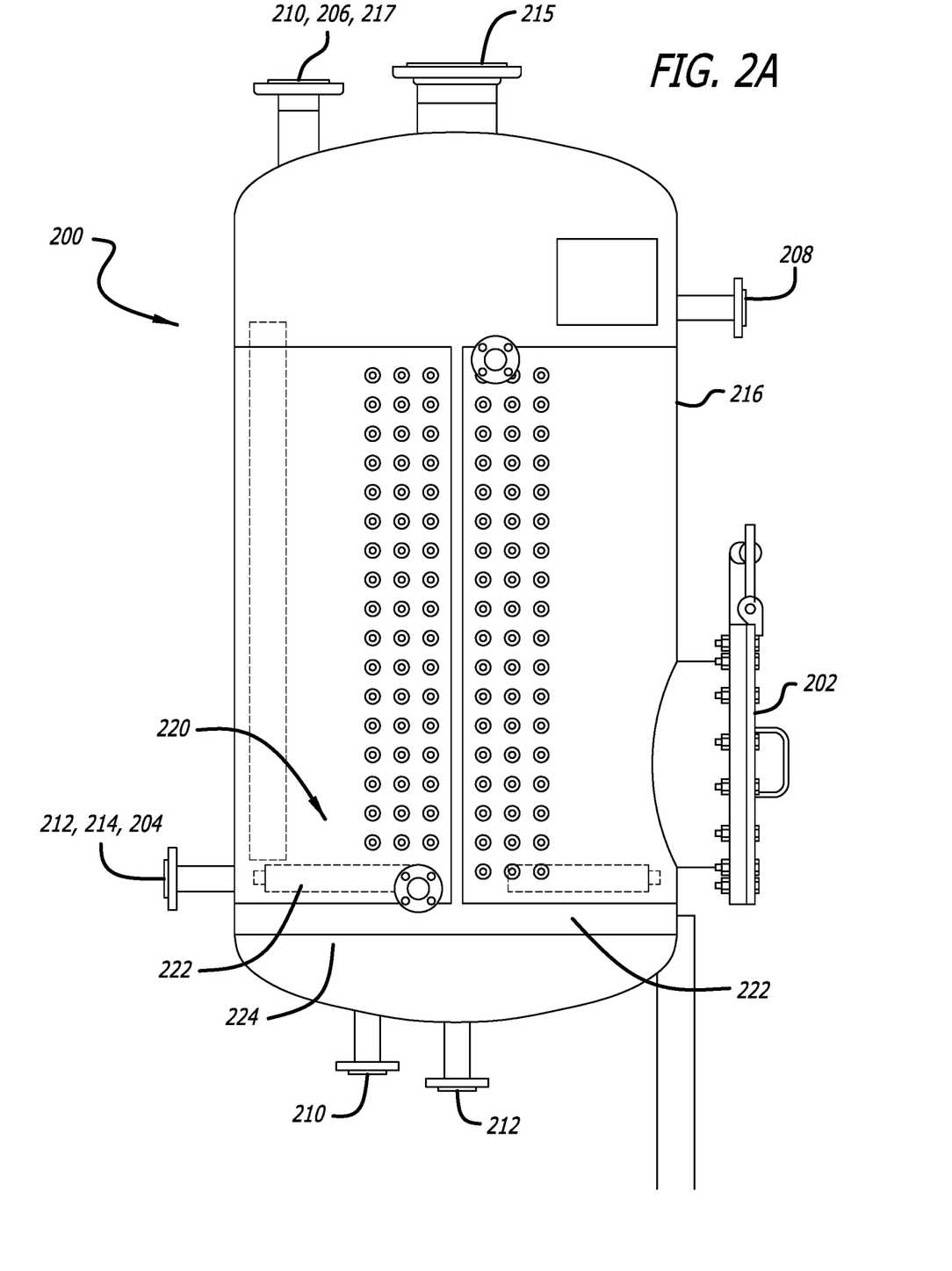
FIGS. 2a-2d illustrate one example of a reactor design of the present invention.
Figure 2B:
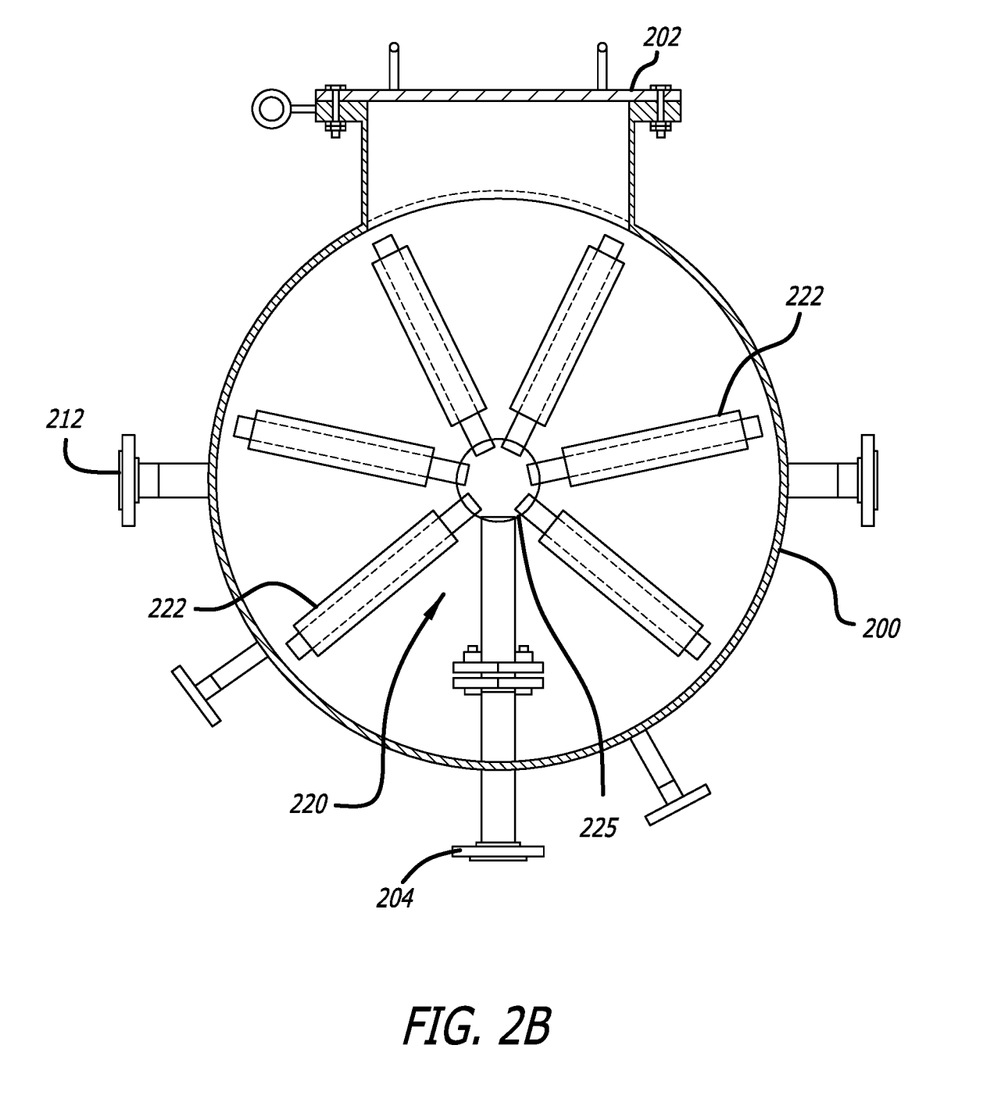
Figure 2C:
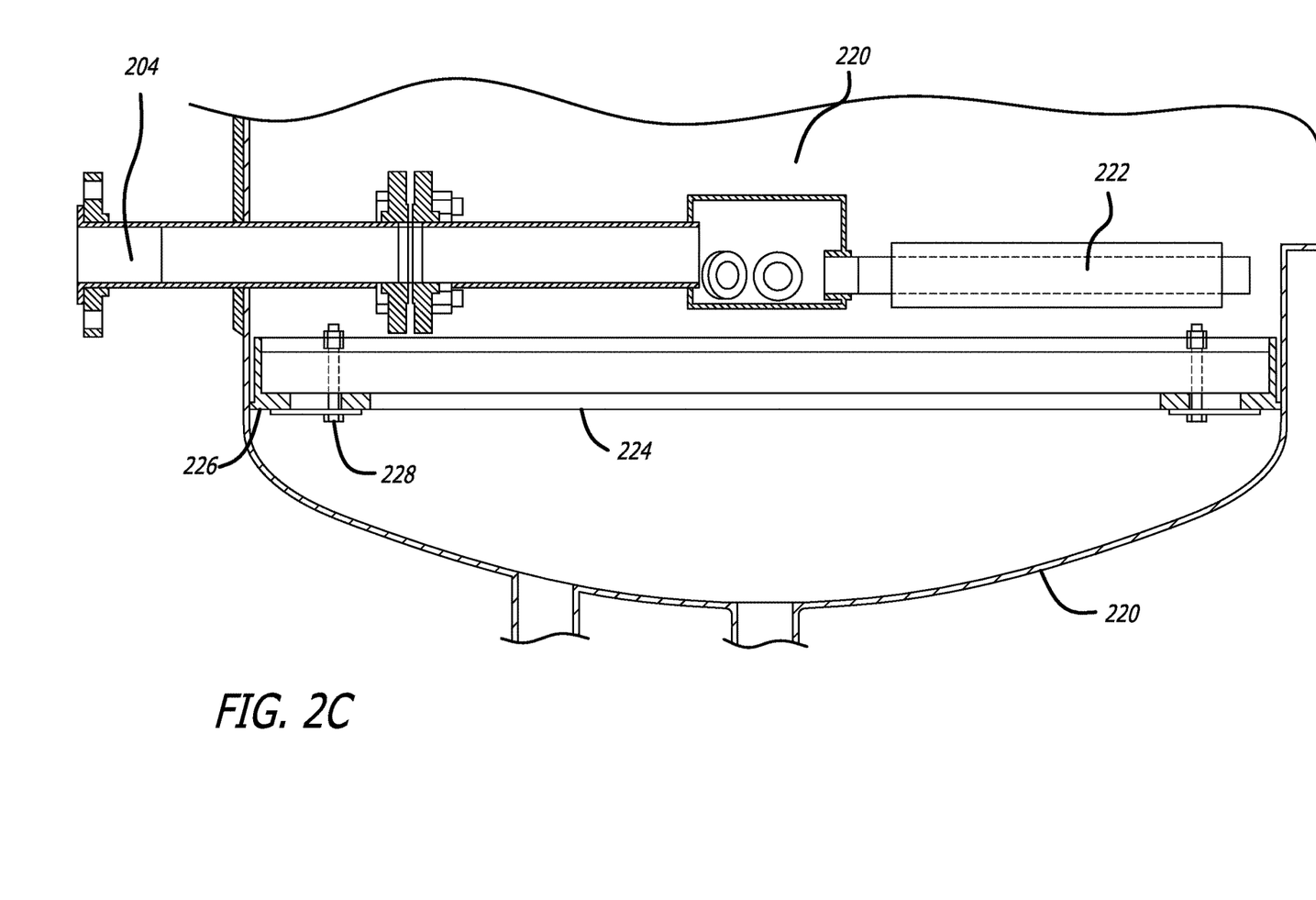
Figure 2D:
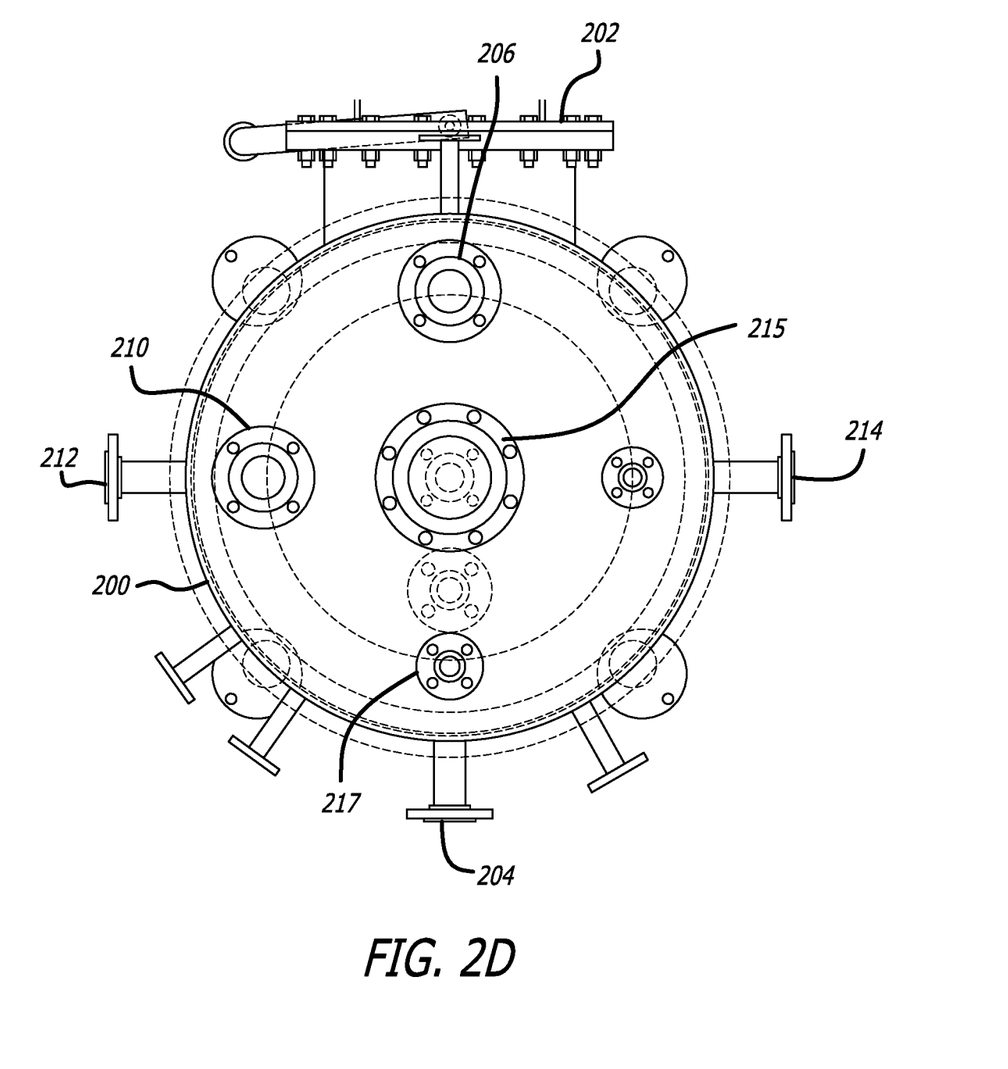
Figure 3:
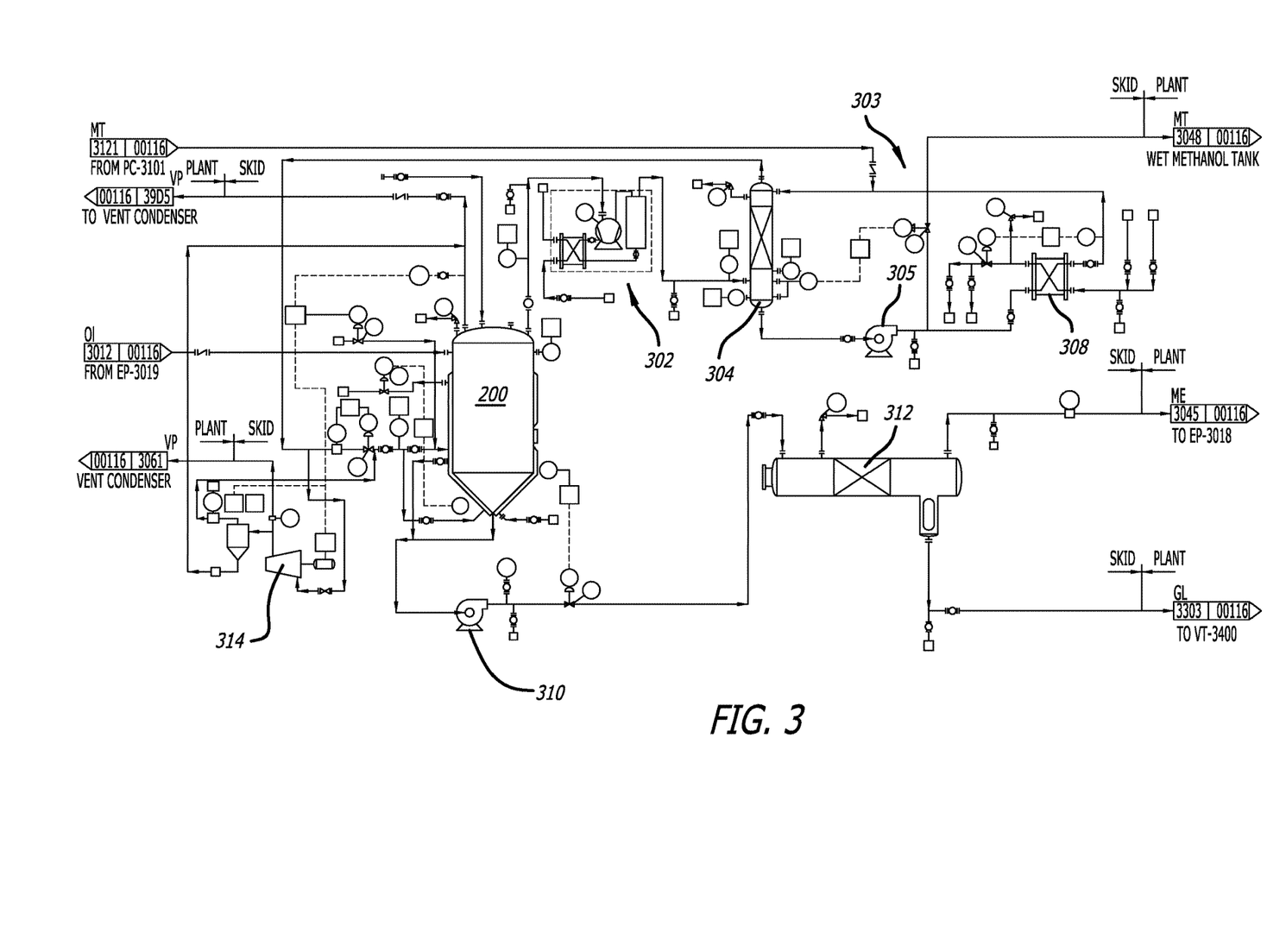
FIG. 3 illustrates one example of system components utilized for the operation of the reactor of the present invention.
Figure 4:
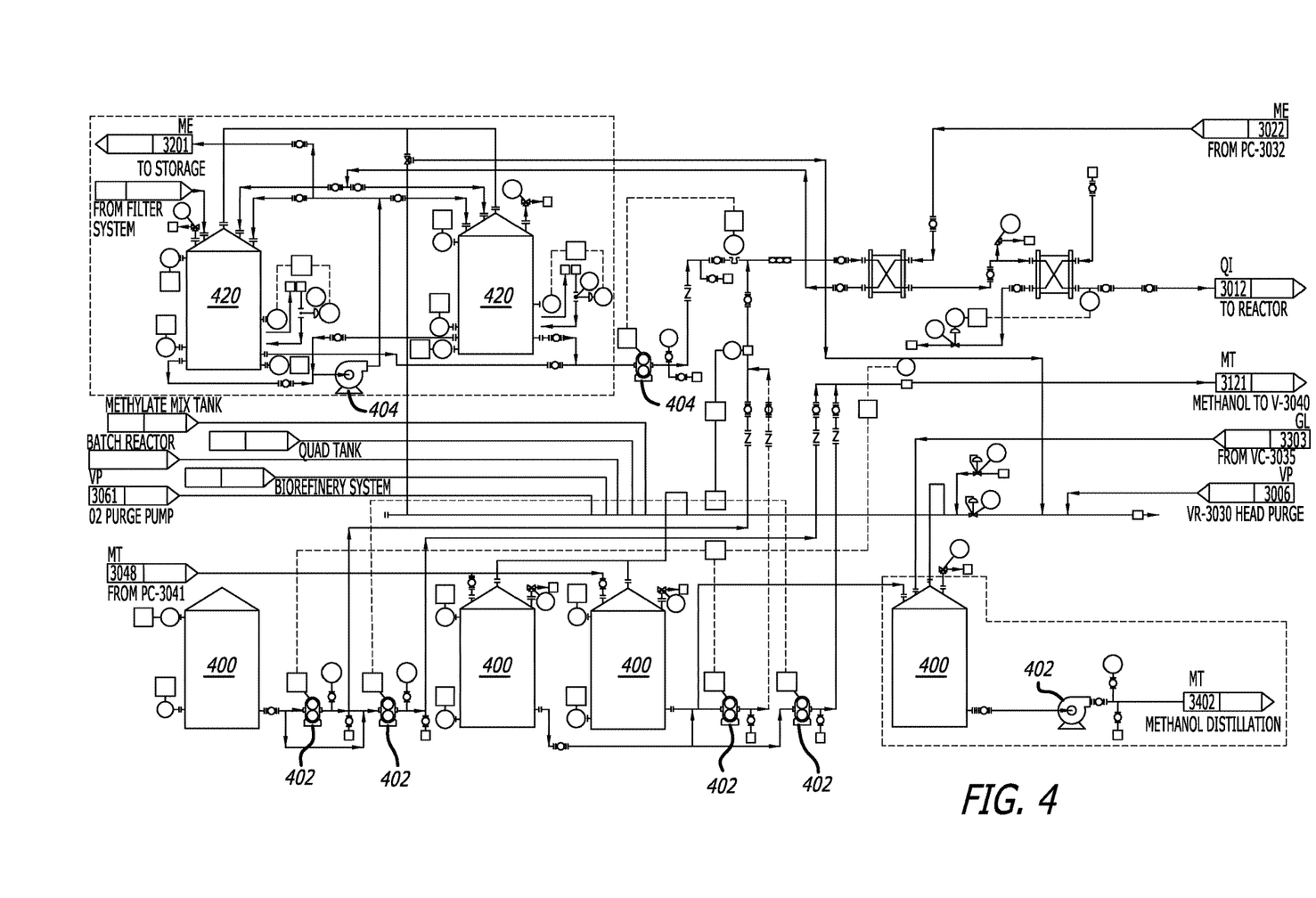
FIG. 4 illustrates one example of the system components of the feed tanks and recirculation pumps of the present inventions.

As illustrated in FIGS. 2-4 below, a reactor system 100 is provided that includes (i) a reactor or reactor tank 200, (ii) one or more feed tanks 400, 420 (e.g. alcohol tanks/raw material tanks), (iii) circulating pumps; and (iv) air and liquid circulation lines. In particular, FIGS. 2a-2d illustrate one example of a reactor 200 of the present invention. FIG. 3 illustrates one example of system components utilized in the operation of a multi-stage, automatic continuous stirred reactor system of the present invention. FIG. 4 illustrates one example of further system components utilized in a multi-stage, automatic continuous stirred reactor system and in particular, the feed tanks and recirculating pumps. Circulation lines are illustrated on both FIGS. 2 and 3 to connect the system such that the various parts are in communication with one another in a manner that recirculates the methanol, water and raw material through the system of the present invention.

FIG. 2a illustrates one example of an elevation view of a reactor tank 200 that may be utilized in connection with the present invention. In the example described in this application, the reactor tank 200 may be, for example, a stainless steel feedstock tank. The reactor tank 200 may further include a manway 202 for internal tank access, as well as inlets for gas 204, catalysts 206 and raw material/feedstock inlet 208 and outlets for gas 210, liquids 212 and catalyst 214. The reactor tank 200 is further equipped with an agitator mount 215, a pressure relief outlet or valve 217 and standard components for monitoring and recording the temperature and pressure of the vessel. To maintain a constant tank temperature, the reactor tank 200 is also equipped with a heating element 216, which in the illustrated example takes the form of a dimple jacket surrounding the center belly of the reactor tank 200. Other heating elements 216 may be utilized; however, those skilled in the art will recognize that the heating of the reactor tank 200 should occur in a manner that does not result in localized hot spots as this could cause catalyst deactivation.

As illustrated in FIGS. 2b, 2c and 2d, internal to the tank 200 in communication with the gas inlet 204 where the alcohol is introduced into the tank 200, the tank 200 includes a sparged unit 220, which includes a series of sparger arms 222 to disperse the gas as it enters the tank 200. A screen 224 is also provided adjacent to the sparged unit 220 to prevent the backflush of catalyst into the air lines 210 or the liquid outlets 212. Additional screens may be positioned over the liquid outlets 212 to further protect from catalyst backflush.

FIG. 2b is a cross-section view of the tank 200 taken along FIG. 2a that best illustrates the radial arrangement of the sparged arms 222 of the sparged unit 220 within the tank 200. As shown, gas is feed into the tank via gas inlet 204 and is dispersed into the sparged arms 222 via a central pipe hub 225. FIG. 2c is an elevation view of a partial cross-section of the tank 200 that further illustrates at least one sparger arm 222, the screen 224 positioned adjacent the sparger arm 222 and the dimple jacket 216 surrounding the tank 200. A cross-section of the central pipe hub 225 showing the gas feed into the sparged arms 222 is also provided.

In particular, FIG. 2c illustrates a cross-section of the tank 200 taken through the sparged unit 220 and illustrates the gas inlet pipe 204 feeding into the central pipe hub 225 or radial junction for dispersing the gas through the radially spaced sparging arms 222. The screen 224 is provided adjacent to the sparged unit 220 and, in the illustrated example, is bolted within the tank 200 interior on a ring support 226 via T-bolt fasteners 228. The screen 224 is provided to ensure that the catalyst structures do not backflush into the air lines 210. The tank 200 may further include a secondary screen (not shown) on the liquid output 212 located above the screen to avoid catalyst loss from the tank through the liquid output 212 located above the screen. A vertical, long wide output pipe can also be utilized can be utilized to avoid catalyst loss. Use of this type of pipe would reduce upward flow of liquid to less than the free fall rate for a catalyst bead and prevents the catalyst structures from leaving the system, except those under a certain size or apparent density.

FIG. 2d illustrates a plan view of the tank 200 showing the gas outlet 210 for communication with a vacuum apparatus, a catalyst inlet 206 and a pressure relief valve/apparatus 217. Although not specifically illustrated, the tank 200 further includes various gauges to measure and monitor tank pressure and temperature and to make system adjustments.

In operation, in order to maximize the efficiency of the system, the tank 200 may be under vacuum (up to 10" hg) by a vacuum apparatus, such as a vacuum pump or a venturi valve. Putting the tank 200 under vacuum not only increases the energy requirements of the gas recirculation pump, but also increases the evaporation of the water from the reactor tank 200. In addition, sparging of the incoming gas into the tank 200 is important to effective operation. Sparging increases vapor phase transfer to methanol and water via increased surface area. In addition to the illustrated sparged unit 220, effective sparging can be done by any arrangement of a sparged ring with small holes, or a sintered metal plate or tubes. Further, in the illustrated and described application, heat is lost due to water evaporation. Accordingly, the temperature of the tank 220 should be maintained at a constant temperature of roughly 45-65 C via the tank's heating element 216, which, in the example, is provided through a dimple jacket around the center of the tank 200.

Turning now to FIGS. 3 and 4, FIGS. 3 and 4 illustrate the use of the reactor tank 200 as part of the reactor system 100. In the example illustrated in FIGS. 3 and 4, the reactor system 100 is a multi-stage, automatic, fully continuous stirred tank reactor system. Reactor tank 200 is connected to a vacuum apparatus, which in the illustrated example is vacuum pump 302 for creating a vacuum within the reactor tank 200. As noted above, in certain application, a venturi pipe or other apparatus capable for creating a vacuum within the interior of the tank 200 may be utilized. A contact condenser unit 303, including a condenser 304, condenser pump 305 and condenser cooler 308 are also provided as part of the reactor system 100, as well as an oxygen purge pump 314. The purge pump 314 is positioned in communication with the reactor tank 200 to remove excess oxygen gas/air from the reactor tank 200. A coalescer 312 is also provided as part of the reactor system 100. The coalescer 312 is in communication with the reactor tank 200. A circulation pump 310 pumps the liquid expelled from the liquid outlet 212 of the reactor tank 200 to the coalescer 312. The coalescer 312 separates the oil or other byproduct of the reaction in the reactor tank 200 from the methanol produced by the reaction within the reactor tank 200. Once separated or filtered, the methanol is fed to a wet methanol tank 400 illustrated in FIG. 4. The oil or byproduct is then fed to the raw material feed tank 420 illustrated in FIG. 4, as described further below.

FIG. 4 illustrates one example of the raw material or feed tanks 420 and methanol tanks 400 used in the recirculation of the methanol, water and raw material/oil through the reactor tank 200 as part of the reactor system 100. Wet methanol tanks 400 are provided, which may also be referred to as alcohol or feed tanks as the invention is not limited to the use of methanol as the carrier gas. The wet methanol tanks 400 contain methanol and further receive recirculated methanol and water from the reactor tank 200 through the coalescer 312 or through the contact condenser unit 303. At least one methanol feed pump 402 provides methanol to the reactor tank 200. The methanol, before being fed into the reactor is run through the contact condenser 304 of the contact condenser until 303 to liquefy the vapor removed from the reactor tank 200. The vacuum pump 302 is utilized to maintain the pressure of the reactor tank 200 and also to pull the vapor from the head of the reactor tank 200, which vapor is then liquefied by contact condenser unit 303 for cooling purposes and recirculation to the methanol tanks 400. In this manner, excess water is removed from the reactor tank 200. Oxygen and other byproduct gases may also be removed from the reactor tank 200 by the purge pump 314. The liquid dispensed from the reactor tank 200 after passing through the screen 224 of the reactor tank 200 is pumped into the coalescer 312 where the liquid is separated for filtered between oils and other byproduct and methanol, which methanol may further contain water. The oil or byproduct is then recirculated through the system back into the feed tanks 420 which may then be pumped back to the reactor tank 200 through the feed inlet 208. Similarly, the methanol is circulated back to the wet methanol tanks 400 and may then be fed back to the reactor tank 200 through a methanol feed pump 403.

The methanol tanks 400 are likely to be under slight pressure (<5 PSI) and should be pressure rated. Like with the reactor tank 200, the air or gas bubbles provided to the methanol tank should be provided through a sparging technique, which may be a similar sparged unit as that used in the reactor tank 200 or a sparged ring or sintered metal may also be utilized to infuse the air bubbles into the methanol to create the methanol gas for circulation to the reactor tank 200. Air or nitrogen may be sparged into the methanol to create the methanol gas. The methanol tanks 400 may require some cooling due to the exchange of heat from the reactor tank 200. The cooling can be performed from a chiller or a cooling tower (not shown). For example, 40-50 F chilled water will make the moisture removal more efficient, however, it will likely require more energy expended in the form of electricity in the chiller. Further, an 80-100 F cooling tower water will result in a slightly less effective moisture removal but possibly overall less energy use due to the low energy requirements of a cooling tower. Either type cooling tower will work within the system, among mechanisms known for cooling tanks and/or their content.

As illustrated, various pumps are located throughout the system to recirculate the liquid and gas to and from the reactor tanks 200 through the raw material feed tanks 400 and the wet methanol tanks 400. The reactor system 100 is connected to transfer the liquid and gas by a series of pipes for the recirculation of the air, gas and liquids through the reactor system 100.

In particular, the system includes a number of gas pumps for circulating the gas through the reactor system 100. A gas recirculation pump could be a regenerative blower, roots blower, oil-sealed blower (for example, a RoFlo type blower), claw-type blower, liquid ring vacuum pump, or any sort of pump that can generate both the flow required along with the pressure and vacuum generated for optimal operation. Generally, a roots type blower is utilized because of the simplicity, efficiency, and price of the blower as compared to a liquid ring vacuum pump. In some cases, the pump will require internal cooling in the form of an in-housing cooling circuit, or using a heat exchanger to cool the output gas flow and recirculate it back to the inlet (this is much less efficient). In some systems, an air venturi (i.e., an eductor) can be used to generate the necessary air flow. The liquid recirculation to power the venturi can come from recirculation of either the alcohol or the feedstock in their respective tanks 400, 420.

The lines used for air recirculation should be designed to ensure that no build-up of liquid can occur such that a slug of liquid could enter the blower of the pump. In addition, the entire system 100 should be preheated and effectively insulated before full operation to ensure that any methanol or water occurring in the vapor phase remains in the vapor phase while passing through the lines. There should be no low points in the line which could accumulate liquid, both to eliminate the possibility of a slug of liquid to the pump, and to reduce accumulation of liquid water in parts of the system outside of the alcohol tanks 400.

To create the appropriate pressure and vacuum conditions in the system for optimized operations, line sizing and sparging should be designed to restrict flow sufficiently to create these conditions. For example, assuming a gas recirculation pump is pulling from the reactor tank head-space and blowing into the sparging until of a methanol tank, a more restrictive sparger in the reactor tank would results in a vacuum on the pump inlet, a more restrictive methanol tank sparger would result in pressure on the pump outlet, etc.

Further, as described below, the process can be operated as either batch or continuous as defined by the equipment in a variety of ways, from most complex to least complex:

A. Multi-Stage, Automated, Continuous Stirred Tank Reactor (CSTR)

As illustrated in FIG. 4, the process can be operated as a multi-stage, automated, CSTR. Generally, performing the esterification and moisture removal in multiple stages (usually 3) is more efficient than a single stage because the water/methanol removed in each stage can be recycled counter-current to the flow of raw material into the reactor tank. For example, water/methanol from stage 3 is recycled to stage 2 and then from stage 2 to stage 1. This counter current flow of methanol through the methanol tanks in each stage can occur continuously, with constant flow of fresh methanol supplied by a pump into tank 3, then from 3 to 2, and finally from 2 to 1. This results in the most concentrated water in methanol solution as compared to a single stage system that would result in higher production of relatively less concentrated water in the methanol solution. In addition, additional methanol can be added between stages, which acts as a carrier vapor to drive off water. Finally, using a coalescer or other type of continuous separators, allows water, which is out of phase, to be removed between stages. All of these factors cause multi-stage reactions to be more efficient.

B. Batch, Manual CSTR

Using a single batch tank the AB method as described above can be performed. The advantages of multiple stages can also be mimicked here—moisture can be removed by using gravity settling after the reaction (in the reactor, or in another tank), or by continuous recirculation through a coalescer or other physical separation unit (centrifuge, oil/water separator, etc.) or by a contact condenser, or both. Alcohol can be added to the reactor in a step-wise addition method as needed during the reaction using a dosing pump. The alcohol tank can be filled batch-style at the beginning of the reaction, then unloaded at the end of the reaction once (or subsequent reactions) once it has become saturated to the desired level of the operator. In this way, all tanks (feedstock and alcohol) are loaded and unloaded in a batch fashion. Further, the reactor tank can be loaded with the feedstock rather than have it fed by a separate feed tank. This can dramatically reduce system cost as compared to a multi-stage continuous system by eliminating complicated flow controls, pumps, and meters along with piping. In addition, a single batch tank can require as little as one (1) gas recirculation pump (a multi-stage continuous system will require multiple pumps).

Figure 5:
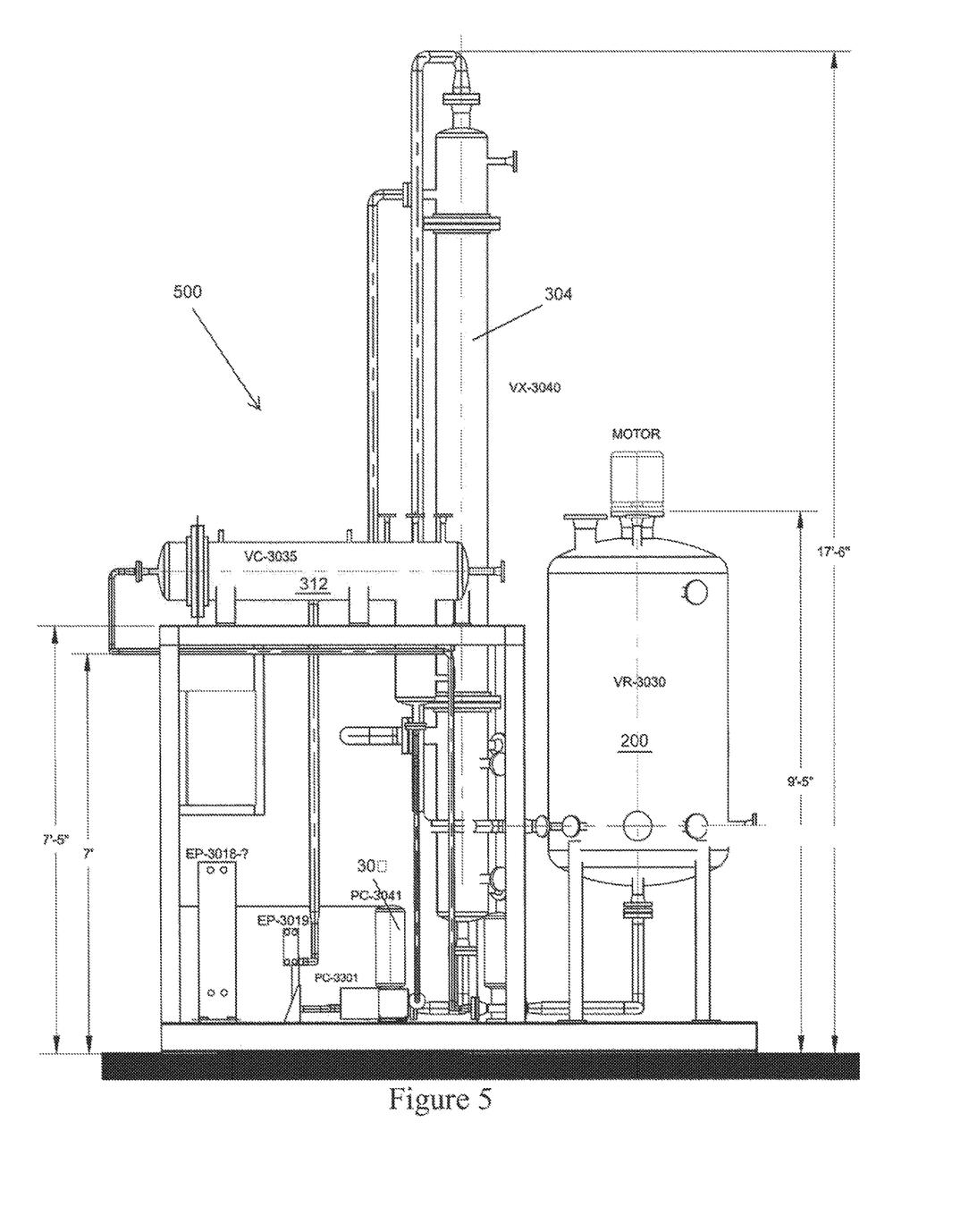

FIG. 5 illustrates one example of a single batch system 500. The system 500 illustrates the use of a reactor tank 200, a condenser 304 and a coalescer 312. The feedstock can be loaded directly into the reactor tank. A vacuum apparatus, such as vacuum pump can be used to draw the vapors from the tank 200 and into the condenser 304. A feed tank and feed pump may be connected to the condenser for feeding, for example, methanol gas into the system. Further, the reactor tank 200 will include the same elements described above for facilitating the reaction, including but not limited to, the sparged unit. While the reaction mixture can be loaded directly in the reactor tank, feed tanks and pumps can also be connected to the batch system for feeding the reaction mixture to the reactor tank.

C. System Applications

While the reactor system 100 in this application is largely described in connection with the utilization of monoalkyl esters of fatty acids, water, and alcohol, the system could be utilized with components with similar physical characteristics. This is most likely to be useful in a reaction mechanism to help drive a reaction to one product, though it may also be useful in simple stripping applications in which it is undesirable to lose a different lighter component of the system—like stripping water out of lubricating oils, as one possible example. Other enzymatic, catalyst or synthesis uses are particularly likely because they can frequently be deactivated by the products of the reaction. The use of the system is not, and should not be, limited to esterification for the production of biodiesel, mono-alkyl methyl esters. The system can be utilized in connection with any esterification process.

Traditional acid esterification using sulfuric acid, or any other catalyst that reacts faster with high methanol concentration and low moisture, is another system application. The same principle can be used with sulfuric acid for continuous water removal during acid esterification. Caution may, however, need to be used to avoid oxidation of sulfuric acid, or sulfuric acid getting into the vapor stream and impacting the pump, or otherwise affecting the vapor-liquid equilibrium in the methanol tank.

The system, as noted above, may further be utilized not only with a biological catalyst like enzymes but with any solid or liquid catalyst. The system may also be utilized with reactions created with ammonia or other N containing compounds to form amides ("ammonia esters"). Similarly, other reactions with biological catalysts like enzymes, like the reaction to form glycerol carbonate from dimethyl carbonate and glycerol, may also occur in the system of the present invention. The system may further be utilized to remove the production of acrylate (like butyl acrylate) or thiol esters, or impurities created via concentration through the gas phase from one liquid to another (like water from lubricating oils).

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A reactor tank having a cavity, an upper end and a lower end, the reactor tank comprising:
    a catalyst inlet;
    a raw material inlet;
    a heating jacket positioned around the center of the reactor tank;
    a first gas outlet at the upper first end of the reactor tank;
    a first gas inlet positioned on a side of the lower end of the reactor tank;
    a first liquid outlet on the bottom of the lower end of the reactor tank;
    a first air line at bottom of the the lower end of the reactor tank to vent air from the reactor;
    a sparged unit positioned near the bottom of the lower end of the reactor tank and in communication with the first gas inlet to sparge a gas received through the first gas inlet, whereby the first gas inlet enters through a reactor tank wall at the lower end of the tank near the sparged unit; and
    a screen positioned underneath, adjacent to, and separated from the sparged unit and above both the first liquid outlet and the first air line between the first gas inlet and the first liquid outlet to prevent the backflush of catalyst into the first air line and the first liquid outlet.

2. The reactor tank of claim 1 further including a vacuum apparatus connected to the first gas outlet for creating a vacuum within the tank.

3. The reactor tank of claim 1 further including an agitator mount.

4. The reactor tank of claim 1 where the sparged unit further includes sparger arms mounted radial about a central pipe hub.

5. A reactor system, the reactor system including:
    a reactor tank having a cavity, a upper end and lower end, whereby the reactor tank includes:
        a catalyst inlet;
        a heating jacket positioned around the center of the reactor tank;
        a first gas outlet at the upper end of the reactor tank;
        a first gas inlet positioned on a side of the lower end of the reactor tank;
        a first liquid outlet at the second end of the vessel;
        a first air line at the lower end of the reactor tank to vent air from the reactor;
        a sparged unit positioned near the bottom of the lower end of the reactor tank and in communication with the first gas inlet to sparge a gas received through the first gas inlet;
        a screen positioned underneath, adjacent to, and separated from the sparged unit and above both the first liquid outlet and the first air line adjacent the sparged unit and spaced apart from the sparged unit where the screen spans across the reactor tank and underneath the sparged unit between the first gas inlet and the first gas liquid outlet to prevent the backflush of catalyst into the first air line and the first liquid outlet; and
    an agitator mount;
    a condenser for pulling and circulating a carrier gas from the reactor tank, whereby the contract condenser entrains moisture created by the reaction in the reactor tank by liquefying the carrier gas and trapping the moisture in an alcohol that absorbs the moisture using a water separator;
    a coalescer; and
        a recirculation pump connected to the first liquid outlet for recirculating at least a portion of the liquid expelled from the liquid outlet.

6. The reactor system of claim 5 further including a vacuum apparatus connected to the first gas outlet for creating a vacuum within the tank.

7. The reactor system of claim 6 where the vacuum apparatus is a venturi valve.

8. The reactor system of claim 6 where the vacuum apparatus is a vacuum pump.

9. The reactor system of claim 5 where the coalescer has at least one circulation pipe for communicating with a feed tank; and where the recirculating pump circulates the liquid from the first liquid outlet to the coalescer for recirculation through the at least one circulation pipe to the feed tank.

10. The reactor system of claim 5 where the sparged unit further includes sparger arms mounted radial about a central pipe hub.

11. The reactor system of claim 5 further including a purge pump for venting gas dispensed from the first air line.

12. A reactor comprising:
    a reactor tank having a cavity, an upper end and a lower end, the reactor tank, the reactor tank comprising:
        a catalyst inlet;
        a heating jacket positioned around the center of the reactor tank;
        a first gas outlet at the upper end of the reactor tank;
        a first gas inlet positioned on a side of the lower end of the reactor tank;
        a first liquid outlet on the bottom of the lower end of the reactor tank;
        a first air line on the lower end of the reactor tank;
        a sparged unit positioned near the bottom of the lower end of the reactor tank and in communication with the first gas inlet to sparge a gas received through the first gas inlet, whereby the first gas inlet enters through a reactor tank wall at the lower end of the tank near the sparged unit; and
        a screen positioned adjacent the sparged unit and spaced apart from the sparged unit where the screen spans across the tank and underneath the sparged unit between the first gas inlet and the first gas liquid outlet to prevent the backflush of catalyst into the first air line and the first liquid outlet;
    a condenser for pulling and circulating a carrier gas from the reactor tank; and a liquid separating unit in communication with the reactor tank to draw liquid from the tank and filter the liquid for recirculation of the filtered liquid.

13. The reactor of claim 12 further comprising a feed tank having a feed pump for pumping a carrier gas into the condenser for pumping the gas into the reactor tank.

14. The reactor of claim 12 where the liquid separating unit is a coalescer.

15. The reactor of claim 12 further including vacuum apparatus connected to the reactor tank for creating a vacuum in the tank and for withdrawing vapor from the tank for circulation to the condenser.

16. The reactor of claim 15 where the vacuum apparatus is a vacuum pump.

\* \* \* \* \*